Jan. 15, 1929.　　　　　　　　　　　　　　　　1,699,303
E. M. MENNICKE ET AL
COFFEE FILTER
Filed Feb. 16, 1927
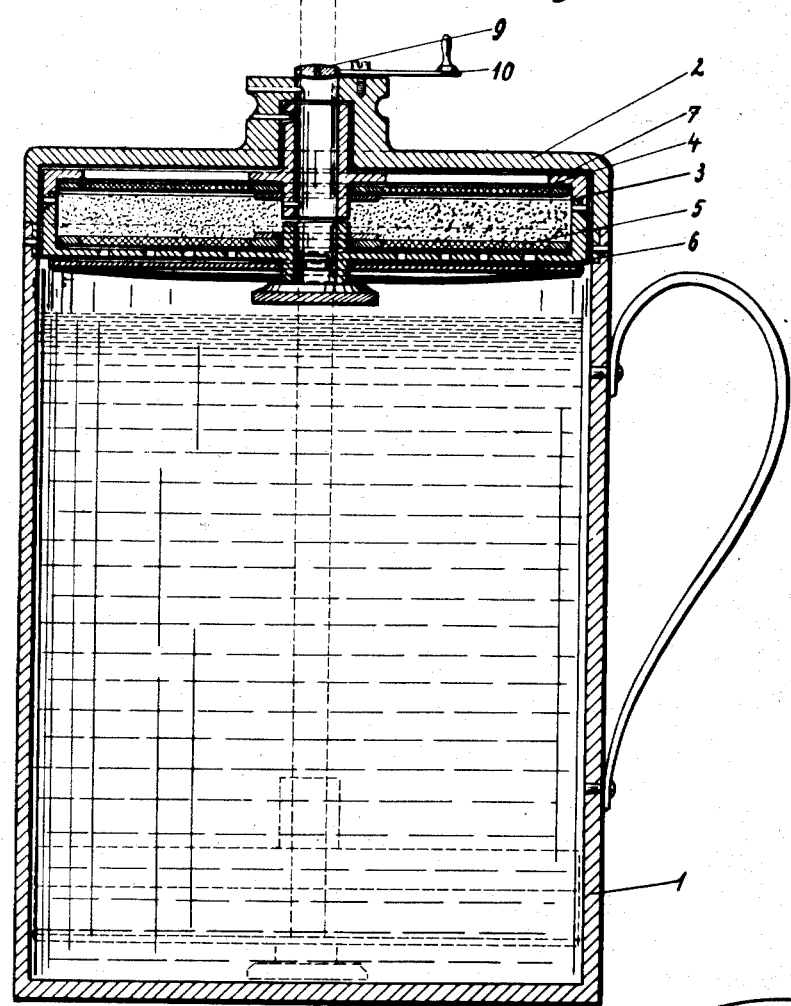
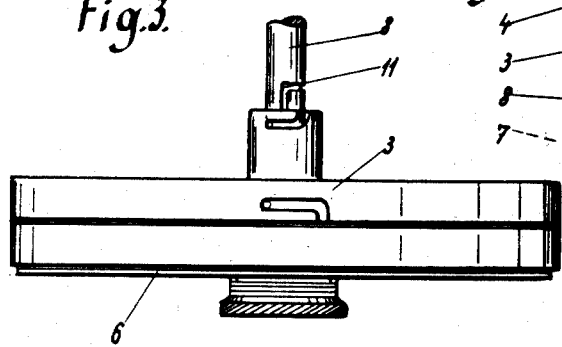
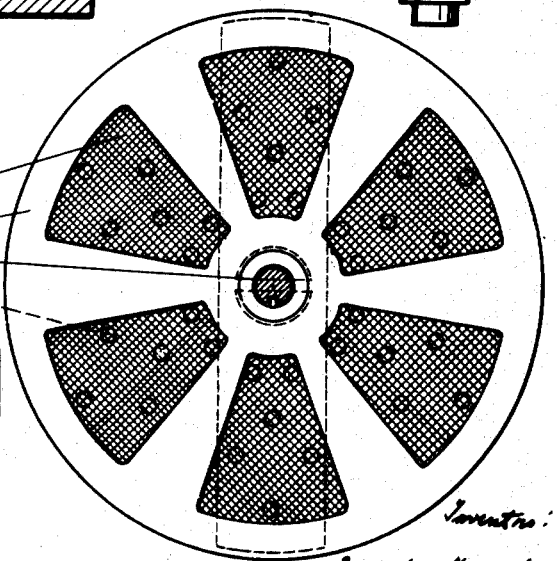

Patented Jan. 15, 1929.

1,699,303

UNITED STATES PATENT OFFICE.

EMIL MAX MENNICKE AND EMIL KURT MENNICKE, OF RASCHAU, ERZGEBIRGE, GERMANY; SAID EMIL MAX MENNICKE ASSIGNOR OF ONE-THIRD TO HUGO G. LOESCH, OF ROCHESTER, NEW YORK.

COFFEE FILTER.

Application filed February 16, 1927, Serial No. 168,652, and in Germany February 24, 1926.

This invention relates to a coffee machine in which the ground coffee is dipped several times into the boiling water until it has been sufficiently extracted. The improved coffee machine according to the invention differs from the dipping coffee machines of known type in that the ground coffee is enclosed in a perforated receptacle which remains, closed on all sides, in the lid of the coffee machine as long as the water is not boiling. As soon, however, as the water begins to boil the perforated receptacle is opened at the lower end, by means of a special mechanism, and then repeatedly lowered and lifted, i. e. dipped into the boiling water.

The improved coffee machine is shown, by way of example, in the accompanying drawing in which:—

Fig. 1 is a vertical section.

Fig. 2 shows in front elevation a portion of the shifting rod with the guide groove for the bayonet joint.

Fig. 3 is a side elevation of the receptacle for the ground coffee.

Fig. 4 is a top plan view of Fig. 3.

In the lid 2 of the coffee pot 1 of the coffee machine a coffee container 3 is accommodated, the bottom plate of which is perforated. On this bottom plate a sieve 5 is placed onto which the ground coffee is laid which is covered by a top sieve 4. The coffee container 3 is secured in its position by a disk 6. By rotating the disk 6 the container is locked in its position or released. As long as the water in the coffee pot does not boil a central rod 8 designed to move the coffee container 3, is removed from the machine. At the top end of the vertical bore in lid 2 designed to receive the guide rod 8 a steam valve 9 may be arranged which is opened by the steam-pressure and signals that the water is boiling.

The guide groove of the rod 8 serving to produce the bayonet joint, shown in Fig. 2, consists essentially of a groove 11 extending in the longitudinal direction of the rod and having the shape shown in Fig. 2. This groove 11 serves, together with a pin in the bore of the lid, to guide the rod 8 in the lid. From the groove 11 a short horizontal groove 12 is branched which is designed to produce, together with a guide pin in the upper disk 7 the bayonet joint between rod 8, and the coffee container 3. When the water has begun to boil the valve 9 is turned to the side by means of a hand lever 10 and the rod 8 is inserted so that the longitudinal groove 11 engages over the guide pins. By a slight pressure upon and rotation of the rod 8 the guide pin in the bottom plate 7 of the container 3 is brought into engagement with the branch groove 12 and connects thus the rod 8 with the coffee container 3. By further rotation of the rod 8 the bayonet joint between the coffee container 3 and the lid 2 is disengaged so that the coffee container is released and can be dipped into and lifted out of the boiling water. When this movement has been repeated several times the coffee is extracted.

The coffee container can be removed after removal of the lid.

The lower disk 6 may have apertures or not; in the latter case it is slightly pressed downwards in opposition to the action of a spring to render the coffee container accessible.

The coffee container is held in the lid by a bayonet joint.

We claim:—

1. A dipping coffee machine, comprising in combination with a coffee pot, a lid of said pot having a central bore, a container for ground coffee having a perforated bottom plate a central bore, a sieve on said perforated bottom plate, a sieve on top of the ground coffee in the container, a bayonet joint for holding said coffee container in the lid, a guide pin in said central bore in said bottom of the coffee container, and means for releasing said coffee container and for dipping the same into the boiling water.

2. In a dipping coffee machine as claimed in claim 1 the means for releasing the coffee container and for dipping the same into the boiling water consisting of a rod having a vertical groove bent to form a bayonet groove and a horizontal branch groove below the bend so that it can be inserted into said central groove of the lid and the container and forms a bayonet joint with the disk underneath said plate to separate by a slight rotation this plate from said container to disconnect by a further rotation the bayonet joint connection between said coffee container and the lid and for dipping said coffee container repeatedly into the boiling water.

3. A coffee making appliance comprising, in combination, a liquid receptacle, a ground coffee container within said receptacle, a rod extending through said receptacle and connected to said container for moving the latter within the receptacle, and mechanism independent of said rod for retaining the container within the receptacle at a point adjacent the top of the latter.

4. A coffee making appliance comprising, in combination, a liquid receptacle, a ground coffee container within said receptacle, a rod extending through said receptacle and connected to said container for moving the latter within the receptacle, and a pin and slot connection between said container and said receptacle for retaining the former at a point adjacent the top of the latter independently of said rod.

5. A coffee making appliance comprising, in combination, a liquid receptacle, a ground coffee container within said receptacle, mechanism for retaining said container at a point adjacent the top of the receptacle, and detachable means operable from a point exteriorly of said receptacle for engaging said container, releasing said retaining mechanism, and moving said container within the receptacle.

6. A coffee making appliance comprising, in combination a liquid receptacle having an aperture therein, a ground coffee container within said receptacle, mechanism for retaining said container at a point adjacent the top of the receptacle, and a detachable operating rod arranged to be inserted through said aperture into cooperation with said container, movement of said rod in one direction serving to connect said container to said rod, and continued movement of the rod in the same direction serving to disengage said retaining mechanism to permit movement of the container within the receptacle in response to movement of said rod.

7. A coffee making appliance comprising, in combination, a liquid receptacle having an aperture therein, a ground coffee container within said receptacle, mechanism for retaining said container at a point adjacent the top of the receptacle, an audible signalling device movably mounted on said receptacle in position to be placed over said aperture and to be operated by steam escaping therethrough when liquid within said receptacle is boiling, and a detachable operating rod arranged to be inserted through said aperture into cooperation with said container when said signal is displaced from the aperture, said rod being engageable with the container so that the container may be moved through said boiling liquid in response to movement imparted to said rod.

In testimony whereof we affix our signatures.

EMIL MAX MENNICKE.
EMIL KURT MENNICKE.